United States Patent Office 3,396,178
Patented Aug. 6, 1968

3,396,178
PRODUCTION OF CHLOROQUINONES
Solomon Marmor, Las Vegas, N. Mex., assignor to Research Corporation, New York, N.Y., a non-profit corporation of New York
No Drawing. Filed Sept. 20, 1965, Ser. No. 488,733
3 Claims. (Cl. 260—396)

ABSTRACT OF THE DISCLOSURE

Chloroquinones of the benzene and naphthalene series are produced by subjecting the corresponding quinones to the action of aqueous hypochlorous acid and an organic peroxide in a common solvent for the reactants.

---

This invention relates to a method for the production of chloroquinones of the benzene and naphthalene series.

I have found that treatment of quinones of the benzene and naphthalene series with aqueous hypochlorous acid in a common solvent or solvent mixture and in the presence of organic peroxides results in the production of the corresponding chloroquinones in good yield at normal room temperatures (typically 20–25° C.).

The organic peroxides may be added to the reaction mixture as such or the peroxide may be supplied by the use as solvent or solvent component of an organic liquid containing peroxide formed thereon on standing in the presence of air and light.

Dioxane containing adventitious organic peroxide in amounts of the order of 1% is very satisfactory both as a reaction medium and as solvent. Other solvents such as tetrahydrofuran and isopropyl ether containing comparable amounts of adventitious organic peroxide may also be used. Peroxide-containing solvents, such as isopropyl ether, which have a limited miscibility with water are preferably used in admixture with sufficient amounts of a water-miscible solvent, such as acetone, to result in a homogeneous reaction mixture.

The hypochlorous acid may be formed in situ, for example, by passing chlorine into a water-dioxane solution of the quinone containing an organic peroxide, either adventitious or added. However, in this procedure both monochloro- and dichloro-quinones are typically formed in approximately equimolecular amounts and must be separated, for example, by column chromatography on silica gel with 60% benzene-40% cyclohexane as eluting solvent and fractional crystallization from ethanol.

The following examples are illustrative of the principles of the invention.

2-chloro-1,4-naphthoquinone.—To 2.0 g. of 1,4-naphthoquinone dissolved in 80 ml. dioxane containing about 1% peroxide was added 30 ml. of 1.4 M aqueous HOCl over a period of 15 minutes. The temperature of the reaction mixture was maintained at 20–25° C. by means of an ice-water bath applied as needed. The reaction mixture was then stirred at room temperature for two hours. Determination of the completion of the reaction was performed by analysis of one milliliter samples for unreacted HOCl.

The yellow solution was evaporated to half its original volume and then diluted with water until no further precipitation occurred. The bright yellow solid that separated was filtered, and the filter cake was washed thoroughly with water. After air drying the solid weighed 2.3 g. and had a melting range of 106–110° C. The product was recrystallized from ethanol and 1.5 g. (63.8% yield) of 2-chloro-1,4-naphthoquinone, M.P. 115–115.5° C. was obtained.

Similar results were obtained when using a mixture of acetone and the peroxide-containing dioxane and acetone and peroxide-containing isopropyl ether in 1:1 proportion, as well as with peroxide-containing tetrahydrofuran and with acetone (80 ml.) to which 2 ml. of 70% t-butyl hydroperoxide had been added. Under the same conditions, using as solvent acetone with no added peroxide, no chloronaphthoquinone was obtained even after 384 hours at 25° C.

2-methyl-3-chloro-1,4-naphthoquinone.—To a solution of 2.0 g. of 2-methyl-1,4-naphthoquinone in 75 ml. dioxane (containing about 1% peroxides) was added 25 ml. of 1.6 M of aqueous HOCl solution over a period of 10 minutes. The reaction mixture was cooled to 5–10° C. during the addition and maintained in that temperature range for thirty minutes. Another 25 ml. of hypochlorous acid solution was slowly added, and the reaction mixture was allowed to warm up to room temperature. After stirring for seven hours, 75 ml. of water was added. The precipitated yellow solid was removed by filtration and washed thoroughly with water. The air-dried product weighed 2.1 g. and had a melting range of 138–150° C. The product was recrystallized from acetic acid-water, yielding 1.4 g. (56%) of 3-chloro-2-methyl-1,4-naphthoquinone, M.P. 152–153° C.

3 - chloro - 2,5 - diphenyl - 1,4 - benzoquinone.—Twenty-five milliliters of 1.6 M aqueous hypochlorous acid solution was added to a stirred solution of 1.0 g. 2,5-diphenyl-1,4-benzoquinone in 150 ml. dioxane containing about 1% peroxide. The temperature was maintained at 20–21° C. during the addition, which required 10 minutes. After the mixture was stirred for one hour at 20–25° C. another 15 ml. of HOCl solution was added. The mixture was stirred at room temperature for six hours and then evaporated down to about one-fourth its original volume. Fifty milliliters of water was added and the orange-yellow solid was filtered and washed thoroughly with water. The solid weighed 1.1 g. and melted at 185–188° C. The crude product was recrystallized from acetone and 0.95 g. (84.8% yield) of 3 - chloro - 2,5-diphenyl-1,4-benzoquinone, M.P. 187–189° C. was obtained.

It is believed that the reaction involves the formation of free radicals for which the peroxides serve as initiators and the organic peroxides useful as initiators in polymerization processes, particularly the alkylhydroperoxides, dialkylperoxides and diacylperoxides, may be used in the method of the present invention.

I claim:
1. A method for the production of chloroquinones of the benzene and naphthalene series which comprises subjecting the corresponding quinone to the action of aqueous hypochlorous acid and an organic peroxide in a common solvent for the reactants.
2. A method for the production of 2-chloro-1,4-naphthoquinone which comprises subjecting 1,4-naphthoquinone to the action of aqueous hypochlorous acid and an organic peroxide in a common solvent for the reactants.
3. A method for the production of 2-chloro-1,4-naphthoquinone which comprises subjecting 1,4-naphthoquinone to the action of aqueous hypochlorous acid and tertiary butyl hydroperoxide in a common solvent for the reactants.

References Cited

Journal of Organic Chemistry, vol. 30 (1965), by Marmor, pp. 3556 and 3557 relied on.

LORRAINE A. WEINBERGER, *Primary Examiner.*

L. A. THAXTON, *Assistant Examiner.*